United States Patent
Wolf

[15] 3,707,332
[45] Dec. 26, 1972

[54] DRILLING FIXTURE FOR A DIMINUTIVE ELONGATED DRILL

[72] Inventor: Fred K. Wolf, 3562 W. 147th Street, Cleveland, Ohio 44111

[22] Filed: May 18, 1970

[21] Appl. No.: 38,404

[52] U.S. Cl. ................................. 408/143, 408/705
[51] Int. Cl. ............................................. B23b 49/00
[58] Field of Search .......... 408/705, 143, 199, 97, 51; 90/14

[56] References Cited

UNITED STATES PATENTS

| | | | |
|---|---|---|---|
| 2,507,503 | 5/1950 | Cudini | 408/705 X |
| 3,555,964 | 1/1971 | Fleming | 90/14 |
| 2,536,333 | 1/1951 | Waxelbaum | 408/705 X |
| 2,795,977 | 6/1957 | Carlstedt | 408/705 X |
| 2,251,701 | 8/1941 | Dixon | 408/705 X |

Primary Examiner—Andrew R. Juhasz
Assistant Examiner—Z. R. Bilinsky
Attorney—Woodling, Krost, Granger and Rust

[57] ABSTRACT

Drilling fixture for a diminutive, elongated drill, including a rotary driven drill holder for rotating said drill relative to a work-piece and reciprocable means for providing a relative reciprocal movement in an axial drilling direction between said drill and said work-piece. Stabilizing means is provided to stabilize the elongated drill against a whipping motion and comprises at least first and second drill support means mounted in axial alignment with respect to each other between said drill holder and said work piece for radially supporting said elongated drill along its axis. At least one of said drill support means is movable along the axis of the drill to vary the axial spacing between said drill support means.

20 Claims, 1 Drawing Figure

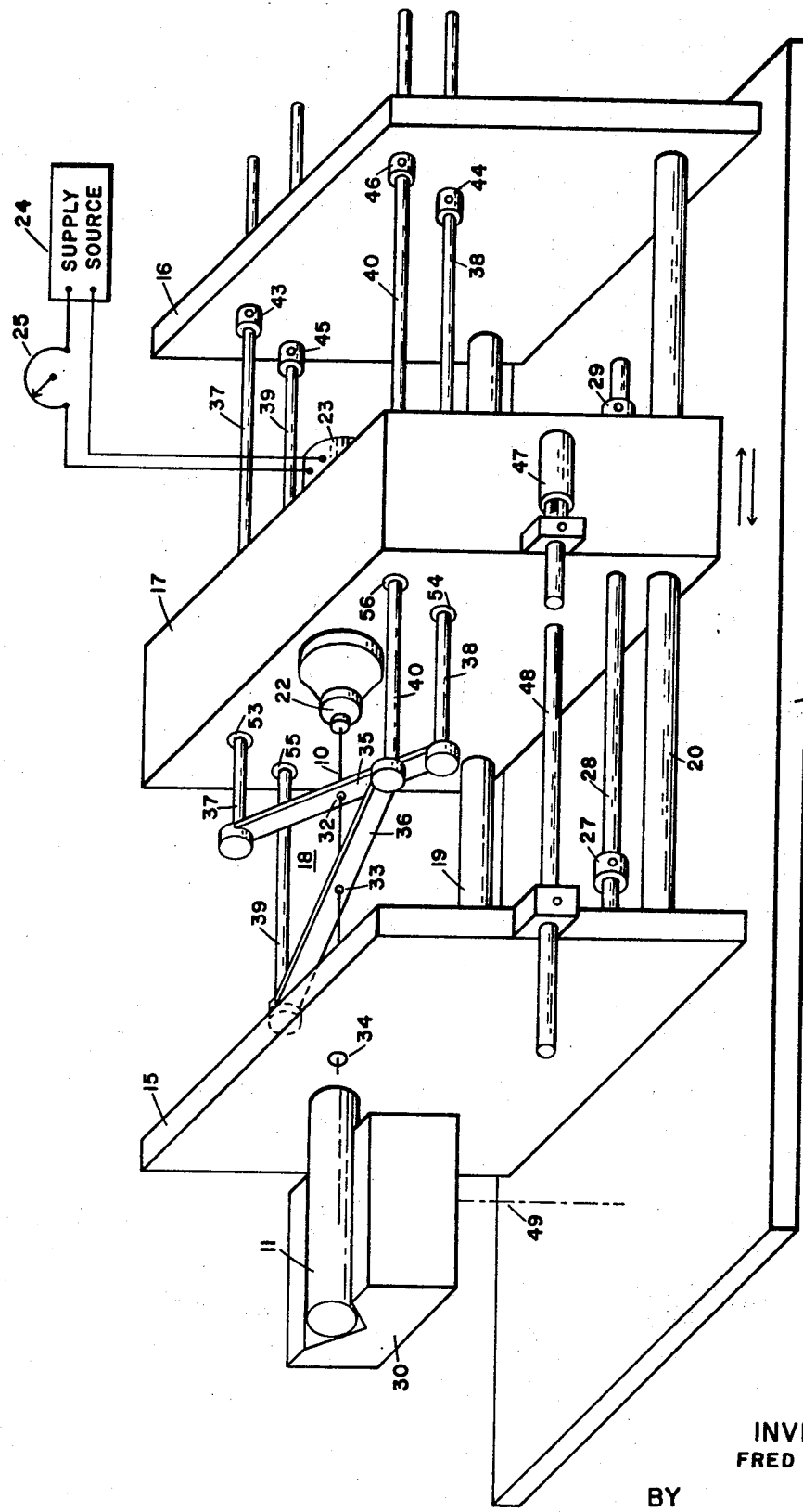

DRILLING FIXTURE FOR A DIMINUTIVE ELONGATED DRILL

BACKGROUND OF THE INVENTION

A diminutive, elongated drill is prone to develop a whipping motion when driven at an effective cutting speed relative to a work piece. One particular application for these small drills is that of drilling small diameter, deep flush holes in graphite electrodes used in electrical discharge machines through which fluid is pumped for flushing out the formation of sludge. The drills are available in several diameters, ranging from approximately 0.0135 to 0.052 inch. Their length may vary from 4 to 6 inches.

High speed and jerky feeds are two conditions that may cause a whipping motion. Of course, high speed is very desirable in order to minimize the drilling cost. Jerky feeds tend to bow the drill due to sudden end thrusts.

The prevailing practice has been to ignore drilling cost and resort to a procedure of operating the drill at a speed which is just below the point at which the drill wound normally begin to "whip". With respect to a jerky feed, this is something that the trade has attempted to overcome by steady hands.

Accordingly, it is an object of my invention to operate the drill at high speed, here a whipping action would normally occur, and then prevent the shipping action, whereby rapid drilling is achieved for reducing the drilling cost.

Another object is to stabilize the elongated drill along its axis to prevent whipping.

Another object is the provision of at least two drill supports for stabilizing the drill along its axis between the rotary drill holder and the work piece, wherein at least one of the drill supports is axially movable along the axis of the drill to vary the axial spacing between the drill supports.

Another object is to vary the axial spacing automatically.

Another object is to space at least two drill supports axially apart along the axis of the drill to provide an interval therebetween and to reduce the extent of the interval as the drilling progresses.

Another object is the provision of reciprocable means for providing a relative reciprocal movement in an axial drilling direction between the drill and the work piece and of stabilizing the drill along its axis in response to the reciprocal movement.

Another object is the provision of supporting the drill along its axis at the beginning of the drilling operation by at least two axially spaced apart drill supports and of reducing the extent that the drill supports are axially spaced apart as the drilling progresses.

Another object is to adjustably feed the drill into the work piece by turning a micrometer and thereby avoid jerky feeding.

SUMMARY OF THE INVENTION

The invention constitutes a drilling fixture for a diminutive, elongated drill, including a rotary driven drill holder for rotating said drill relative to a work piece and reciprocable means for providing a relative reciprocal movement in an axial drilling direction between said drill and said work piece, said elongated drill possessing in proneness to develop a whipping motion when driven at an effective cutting speed relative to said work piece, and stabilizing means to stabilize said elongated drill against said whipping motion, said stabilizing means comprising at least first and second drill support means mounted in axial alignment with respect to each other between said drill holder and said work piece for radially supporting said elongated drill, at least one of said drill support means being movable along the axis of said drill to vary the axial spacing between said drill support means.

Other objects and a fuller understanding of the invention may be had by referring to the following description and claims, taken in conjunction with the accompanying drawing.

BRIEF DESCRIPTION OF THE DRAWING

FIG. 1 is a view illustrating the structural and operative features of my invention, the diminutive drill being diagrammatically illustrated by a single line, which, of course, is still larger than the actual size of the drill; the line shading of the drawing has been applied only to the round parts, whereby they may be readily distinguishable from the flat surfaces.

DESCRIPTION OF THE PREFERRED EMBODIMENT

As illustrated, my drilling fixture is adapted to operate a diminutive, elongated drill 10 relative to a work piece 11. In the illustration, the work piece may comprise a graphite electrode used in electrical discharge machines. The drill 10 may have a diameter residing in a range of approximately 0.0135 to 0.052 inch. Its length may vary from 4 to 6 inches. Of course, larger drills may be used in my fixture, but the real problem arises when drilling small diameter, deep holes through which fluid may be pumped for flushing out the formation of sludge. Being diminutive in diameter, the elongated drill 10 is longitudinally flexible and thus tends to develop a whipping action when driven at an effective cutting speed.

My drilling fixture, in general, may comprise, a base 14, front and back upright members 15 and 16, a main carrier 17, and a system of stabilizing drill support members, indicated generally by the reference character 18. The upright members 15 and 16 may be suitably fastened to the base 14 and are arranged to support two main guide rods 19 and 20 above the level of the base 14 and upon which the main carrier 17 may be slidably and reciprocably mounted, as indicated by the reversing arrows, for providing a relatively reciprocal movement in an axial drilling direction between the drill 10 and the work piece 11. The main carrier 17 is preferably arranged to reciprocate freely on the two main guide rods 19 and 20. Mounted in the main carrier 17 is a rotary drill holder 22 driven by an electric motor 23 connected to a supply source 24 and controlled by a speed device 25. the reciprocal movements of the main carrier 17 may be limited in its forward direction (to the left) by an adjustable forward stop 27 carried upon a rod 28 and in its rearward direction (to the right) by an adjustable rear stop 29 carried on the rod 28. The rod 28 extends freely through the main carrier 17 and has its front end fixedly connected to the front upright member 15. As illustrated, the work piece 11 may be mounted in any suitable work holder 30 connected to the base 14, as illustrated by the dash-dot line 49.

The system of stabilizing drill support members 18 comprise at least first and second drill support bushings 32 and 33 carried respectively by cross-members 35 and 36. The ends of the cross-member 35 are fixedly connected to a first pair of guide rods 37 and 38 which slidably extend through the main carrier 17, as well as through the rear upright member 16. Accordingly, the drill support bushing 32 carried by the cross-member 35 may be reciprocably actuated relative to the main carrier 17 and also relative to the drill 10. The ends of the cross-member 36 are fixedly connected to a second pair of guide rods 39 and 40 which slidably extend through the main carrier 17, as well as through the rear upright member 16. The drill support bushings 33 carried by the cross-member 36 may thus be reciprocably actuated relative to the main carrier 17 and also relative to the drill 10. The reciprocal movements of the pair of guide rods 37 and 38 may be limited in their rearward direction (to the right) by adjustable stops 43 and 44. Similarly, the reciprocal movements of the pair of guide rods 39 and 40 may be limited in their rearward direction by adjustable stops 45 and 46. The reciprocal movements of the cross-member 36, which carries the drill support bushing 33, is limited in its forward direction, when it engages the back side of the front upright member 15 and the reciprocal movements of the cross-member 35, which carries the drill support bushing 32, is limited in its forward direction when it engages the back side of the cross-member 36. The front upright member 15 is provided with a drill support bushing 34 which is in axial alignment with the two drill support bushings 33 and 32, respectively carried by the cross-members 36 and 35.

The feed advancement of the drill 10 into the work piece 11 may be governed by a micrometer 47 suitably mounted on the side of the main carrier 17. The end of the micrometer 47 is adapted to engage the rear end of a micrometer stop rod 48 having its forward end adjustably connected to a side of the front upright member 15.

In setting up the operation for drilling a deep hole into the work piece, the drill 10 is first mounted in the drill holder 22. The drill is mounted from the front side of the front upright member 15, through the stationary drill support bushing 34 and then through the two reciprocal drill support bushings 33 and 32. The adjustable stop 29, which limits the rearward movement of the main carrier 17, is then adjusted so that the drill 10 protrudes from the front side of the stationary drill support bushing 34 for a distance of approximately one or two diameters of the drill. Next, the adjustable stop 27, which limits the forward movement of the main carrier 17, is set to obtain the desired hole depth. The micrometer is set at zero depth and the micrometer stop rod 48 is set to contact the micrometer. The work piece 11 may now be clamped in the work holder 30 and adjusted to a gap preferably of not more than four diameters from the front of the drill 10. The stops 43 and 44 on the bushing guide rods 37 and 38 and the stops 45 and 46 on the bushing guide rods 39 and 40 are set, whereby the spacing (interval) between the drill bushings 34 and 33 is about the same as the spacing between the drill bushings 33 and 32, as well as the spacing between the bushing 32 and the drill holder 22. The elongated drill 10 is thus supported substantially at even intervals along the axis thereof when the main carrier 17 is moved against the rear stop 29. The main carrier 17 is provided with wiper rings 53, 54, 55 and 56 which respectively surround the bushing guide rods 37, 38, 39 and 40 to provide a friction therebetween, whereby reciprocal movements of the main carrier 17 are frictionally transmitted to the bushing guide rods for varying the spacing along the axis of the drill 10.

In operation, the drill motor 23 is started and the speed may be set by the speed control device 25. With light forward hand pressure on the main carrier 17, the micrometer spindle is then revolved to allow the drill 10 to advance into the work piece 11. At entry, a relatively slow advance is preferable to allow the drill o start "on center". After the drill has been advanced for a drilling distance of approximately four to eight diameters, it is retracted out of the work piece to clear the chips. The micrometer 47 remains unchanged during retraction and the main carrier 17 is moved backwards until it engages the rear stop 29. The re-entry of the drill in the hole may be advanced rapidly until the micrometer 47 again engages the micrometer stop rod 48. The drill is now in the same drilling position as it was before retraction. For further drilling, the micrometer is revolved until the drill is advanced for another distance of approximately four to eight diameters, after which it is again retracted to remove the chips. These drilling and retracting operations are repeated until the main carrier 17 engages the front stop 27, which is the setting for the depth of the hole. In the drilling operation, when the micrometer 47 reaches the end of its travel (1-inch) the micrometer rod 48 is reset to a new position to permit the micrometer to operate again within the range of its travel for feeding the drill 10 into the work piece.

In my invention, the drill 10 may be repeatedly retracted from the work piece to clean out the chips. It is to be observed that upon each retraction of the main carrier 17 in a rearward direction against the rear stop 29, the drill support bushings 32 and 33 are restored to their original positions. It is during the time when the main carrier 17 is being returned to its drilling position that the relative positions of the bushings may become axially varied. Thus, the spacing (interval) between the bushings 33 and 34 becomes less and less, by increments substantially equal to the previous drilling depth, upon each return advancement of the drill 10 into the work piece after cleaning. The interval continues to decrease until the bushing 33 engages the back side of the front upright member 15. As the drilling advances still deeper, the interval between the bushing 33 and 32 starts to decrease, increment by increment, upon each return advancement of the drill 10 into the work piece after cleaning. The decrease continues until the bushing 32 engages the backside of the cross-member 36. Now, the interval between the bushing 32 and the drill holder 22 starts to decrease upon each return advancement of the drill 10 into the work piece after cleaning. It continues to decrease until the main carrier 17 engages the front stop 27, which is the stop that determines the hole depth. It is to be noted that upon each return advancement of the drill into the work piece after cleaning, the spacing of the drill support bushings along the axis of the drill become less and less until the hole depth is obtained and that upon each retraction of the main carrier 17 against the rear stop 29, the drill support bushings 32 and 33 are restored to their original positions. Accordingly, it is observed that when the drill 10 is retracted from the work piece during cleaning, the drill support bushings are substantially evenly spaced along the axis of the drill to prevent whipping of the drill, as would otherwise tend to occur since the drill is fully extended from the work piece. When the drill 10 is fully within the work piece, there is little, if any, tendency for the drill to whip, since it is supported by the hole. My invention accommodates for this situation, because when the drill is returned into the work piece after each retraction, the spacing between the drill support bushings become axially compressed, being a position of the bushings which may be characterized as a "collapsed" condition. When in the collapsed condition, the drill support bushings make room for the drill holder 22 to advance without interference from the drill support bushings. In my invention, the axial spacing of the drill support bushings is preferably achieved automatically in response to the reciprocal movements of the main carrier 17, but this achievement may be produced otherwise. The present disclosure includes that contained in the appended claims, as well as that of the foregoing description. Although this invention has been described in its preferred form with a certain degree of particularlity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A drilling fixture for a diminutive, elongated drill, including a rotary driven drill holder for rotating said drill relative to a work piece and reciprocable means including carrier means for providing a relative reciprocal movement in an axial drilling direction between said drill and said work piece, said elongated drill possessing a proneness to develop a whipping motion when driven at an effective cutting speed relative to said work piece, and stabilizing means to stabilize said elongated drill against said whipping motion, said stabilizing means comprising at least first and second drill support means mounted in axial alignment with respect to each other between said drill holder and said work piece for radially supporting said elongated drill, rod means slidably supported on said carrier means for carrying said at least one of said drill support means, and friction means between said rod means and said carrier means to reciprocably move said at least one of said drill support means in response to said reciprocal movement of said carrier means.

2. The structure of claim 1, including stop means on said rod means to limit the travel thereof.

3. The structure of claim 1, having micrometer means to adjustably feed said drill into said work piece.

4. The structure of claim 1, having stop means to limit the extent of the total depth of said drill in said work piece.

5. The structure of claim 1, having means for axially spacing at least one of said drill support means from the other to provide an interval therebetween, and means responsive to said reciprocal movement to reduce the axial extent of said interval.

6. The structure of claim 1, wherein the other of said drill support means is stationarily mounted between said drill holder and said work piece.

7. A drilling fixture for a diminutive, elongated drill, including a rotary driven drill holder for rotating said drill relative to a work piece and reciprocable means including carrier means for providing a relative reciprocal movement in an axial drilling direction between said drill and said work piece, said elongated drill possessing a proneness to develop a whipping motion when driven at an effective cutting speed relative to said work piece, and stabilizing means to stabilize said elongated drill against said whipping motion, said stabilizing means comprising at least first and second drill support means mounted in axial alignment with respect to each other between said drill holder and said work piece for radially supporting said elongated drill, first and second rod means slidably supported on said carrier means for respectively carrying said first and second drill support means, and friction means between said first and second rod means and said carrier means to reciprocably move said first and second drill support means in response to said reciprocal movement of said carrier means.

8. The structure of claim 7 including stop means respectively on said first and second rod means to limit the travel thereof.

9. The structure of claim 7, wherein said stabilizing means includes a third drill support means mounted in axial alignment with said first and second drill support means between said drill holder and said work piece.

10. The structure of claim 9, wherein said first and second drill support means are reciprocably movable along the axis of said drill in response to said reciprocal movement of said reciprocable means, and wherein said third drill support means is stationarily mounted.

11. The structure of claim 9, including means for axially spacing said first drill support means from said second drill support means to provide a first interval therebetween and for axially spacing said second drill support means from said third drill support means to provide a second interval therebetween, and means responsive to said reciprocal movement to reduce the axial extent of said intervals.

12. Drilling means for a diminutive, elongated drill, including a rotary driven drill holder for rotating said drill relative to a work piece, drill holder carrier means for carrying said drill holder, mounting means upon which said drill holder carrier means may be reciprocably mounted to provide a reciprocal movement for reciprocably actuating said drill in an axial direction toward and away from said work piece, said elongated drill possessing a proneness to develop a whipping motion when driven at an effective cutting speed relative to said work piece, stabilizing means to stabilize said elongated drill against said whipping motion, said stabilizing means including at least first and second drill support means disposed between said drill holder and said work piece for radially supporting said elongated drill, said first and second drill support means being mounted in axial alignment with respect to each other for radially supporting said elongated drill along the axis thereof with an interval therebetween, at least one of said drill support means including rod means slidably mounted on said drill holder carrier means and being disposed for reciprocal movement relative to the other, and yieldable means to reciprocably move said at least one of said drill support means relative to the other to vary the width of said interval.

13. The structure of claim 12, wherein said other of said drill support means is stationarily mounted between said drill holder and said work piece.

14. The structure of claim 12, including stop means to adjustably vary the extent that said drill holder carrier means may be reciprocably actuated on said mounting means.

15. The structure of claim 12, including adjustable stop means to vary the limits of the travel of said at least one of said drill support means.

16. The structure of claim 12, including third drill support means disposed between said drill holder and said work piece for radially supporting said elongated drill, said third drill support means being mounted in axial alignment with said at least one of said drill support means for radially supporting said elongated drill along the axis thereof with an axial space between said at least one of said drill support means and said third drill support means, said third drill support means being disposed for reciprocal movement relative to said at least one of said drill support means, and second yieldable means to reciprocably move said third drill support means relative to said at least one of said drill support means to vary the width of said axial space.

17. The structure of claim 16, wherein said second yieldable means is movable with said drill holder carrier means for actuating said third drill support means in response to said reciprocal movement of said drill holder carrier means.

18. The structure of claim 16, wherein said third drill support means includes rod support means slidably mounted on said drill holder carrier means.

19. The structure of claim 12, wherein said yieldable means is movable with said drill holder carrier means for actuating said at least one of said drill support means in response to said reciprocal movement of said drill holder carrier means.

20. The structure of claim 12, including stop means comprising first and second contact means, said first contact means being disposed to engage said second contact means, said first contact means being movable with said at least one of said drill support means and being disposed to limit the travel thereof upon engagement with said second contact means, said yieldable means being inoperative to move said at least one of said drill support means upon said engagement of said first contact means with said second contact means.

* * * * *